(12) United States Patent
Klieman et al.

(10) Patent No.: US 12,177,203 B2
(45) Date of Patent: *Dec. 24, 2024

(54) SYSTEM AND METHOD FOR AUTOMATED CUSTOMER VERIFICATION

(71) Applicant: DigiCert, Inc., Lehi, UT (US)

(72) Inventors: Michael Klieman, Belmont, CA (US); Jessica Crewse, Sunnyvale, CA (US); Gautam Kanaparthi, Mountain View, CA (US)

(73) Assignee: DigiCert, Inc., Lehi, UT (US)

( * ) Notice: Subject to any disclaimer, the term of this patent is extended or adjusted under 35 U.S.C. 154(b) by 654 days.

This patent is subject to a terminal disclaimer.

(21) Appl. No.: 17/341,208

(22) Filed: Jun. 7, 2021

(65) Prior Publication Data

US 2022/0029983 A1    Jan. 27, 2022

Related U.S. Application Data (63) Continuation of application No. 14/087,842, filed on Nov. 22, 2013, now Pat. No. 11,032,265.

(51) Int. Cl.
*H04L 9/40* (2022.01)
*G06F 21/33* (2013.01)
*G06Q 30/0251* (2023.01)

(52) U.S. Cl.
CPC .......... *H04L 63/0823* (2013.01); *G06F 21/33* (2013.01); *G06Q 30/0258* (2013.01); *G06F 2221/2117* (2013.01)

(58) Field of Classification Search
CPC ................. H04L 63/0823; G06F 21/33; G06F 2221/2117; G06Q 30/0258
See application file for complete search history.

(56) References Cited

U.S. PATENT DOCUMENTS 7,092,914 B1 *  8/2006  Shear .................... G06F 16/285
                                                    705/67
7,367,049 B1 *  4/2008  Robinson ................ G06F 21/32
                                                    713/186

(Continued)

OTHER PUBLICATIONS

S. Chokhani, W. Ford, R. Sabett, C. Merrill; "Internet X.509 Public Key Infrastructure Certificate Policy and Certification Practices Framework" (Year: 2003).

(Continued)

*Primary Examiner* — John W Hayes
*Assistant Examiner* — Edgar R. Martinez-Hernandez
(74) *Attorney, Agent, or Firm* — Baratta Law PLLC; Lawrence A. Baratta, Jr.; Ryan Odessa (57) ABSTRACT

Techniques are disclosed for identifying and authenticating prospective certificate authority customers of a secure socket layer (SSL) certificate prior to receiving an order from the customer. The CA generates a list of prospective customers of digital certificates (e.g., by scanning networked servers via the Internet for the presence of an installed digital certificate). The CA retrieves data for each customer on the list and determines, based on a set of approval criteria, which prospective customers to target in enrollment campaigns. For each approved customer, the CA initiates an enrollment process prior to receiving a request from the customer to provide a certificate.

19 Claims, 5 Drawing Sheets

(56) References Cited

U.S. PATENT DOCUMENTS

| | | | | |
|---|---|---|---|---|
| 7,386,485 | B1* | 6/2008 | Mussman | G06Q 30/02 705/14.1 |
| 8,191,118 | B2* | 5/2012 | Kim | G06Q 20/40145 726/4 |
| 8,458,455 | B2* | 6/2013 | Anderson | H04L 9/3263 726/10 |
| 8,707,027 | B1* | 4/2014 | Naik | H04L 9/3263 380/258 |
| 8,898,162 | B2* | 11/2014 | Ganis | G06F 16/9537 707/723 |
| 9,225,510 | B1* | 12/2015 | Wharton | H04L 67/02 |
| 9,258,128 | B1* | 2/2016 | Tytula | H04L 63/062 |
| 10,262,761 | B1* | 4/2019 | Weintraub | G16H 50/30 |
| 2002/0111892 | A1* | 8/2002 | Sharp | G06Q 10/08 705/37 |
| 2003/0126098 | A1* | 7/2003 | Hine | G06Q 30/0645 705/30 |
| 2003/0149872 | A1* | 8/2003 | Harrison | H04L 9/321 713/155 |
| 2004/0225604 | A1* | 11/2004 | Foss, Jr. | G06Q 20/385 705/39 |
| 2005/0069136 | A1* | 3/2005 | Thornton | H04L 63/20 380/277 |
| 2005/0257058 | A1* | 11/2005 | Yoshida | H04L 9/0891 713/175 |
| 2006/0015729 | A1* | 1/2006 | Novack | H04L 63/0823 713/173 |
| 2006/0265242 | A1* | 11/2006 | Kashioka | H04N 1/00363 382/100 |
| 2009/0133118 | A1* | 5/2009 | Beattie | G06F 21/6218 726/17 |
| 2010/0228968 | A1* | 9/2010 | Wason | H04L 9/3263 713/169 |
| 2010/0263019 | A1* | 10/2010 | Lemberg | H04L 63/166 726/1 |
| 2011/0087602 | A1* | 4/2011 | Rutman | H04L 12/66 379/93.12 |
| 2011/0106610 | A1* | 5/2011 | Landis | G06Q 30/02 705/14.66 |
| 2012/0101881 | A1* | 4/2012 | Taylor | G06Q 30/04 705/14.36 |
| 2012/0179559 | A1 | 7/2012 | Rogers | |
| 2012/0204032 | A1* | 8/2012 | Wilkins | H04L 9/321 713/170 |
| 2013/0019093 | A1* | 1/2013 | Seidl | H04L 9/006 713/158 |
| 2016/0314498 | A1* | 10/2016 | Srivastava | G06Q 30/0275 |

OTHER PUBLICATIONS

Latifa Boursas, Vitalian A. Danciu; "Dynamic interorganizational cooperation setup in Circle-of-Trust environments" (Year: 2008).

* cited by examiner

SYSTEM AND METHOD FOR AUTOMATED CUSTOMER VERIFICATION

BACKGROUND

Field

Embodiments of the invention generally relate to techniques for performing portions of a certificate enrollment process for potential consumers of an SSL (Secure Sockets Layer) or TLS (Transport Layer Security) certificate enrollment. More generally, embodiments presented herein disclose techniques for automating the identification and authentication of potential customers for a digital certificate prior to receiving an order from the customer.

Description of the Related Art

Both commercial and non-commercial enterprises frequently engage in secure online communications. PKI (public key infrastructure) has evolved to provide a variety of security mechanisms using both symmetric and asymmetric cryptography. For example, one organization can supply a digital certificate, which the organization can present to prove their identity to a relying party. In a PKI scheme, a digital certificate is an electronic document that binds a public key to an identity. To obtain a digital certificate, a customer orders a certificate from a certificate authority (CA). To complete the order, the customer provides information required by the CA to vet the customer's identity. For example, for a certificate used to bind a server to a domain (e.g., an SSL certificate) the CA may request a variety of information used to investigate and authenticate that the request is both from the individual claims to be making the request and that such an individual is authorized within the organization to make such a request. Such information may include the customer's server information, business entity information, and contact information, among other things. The CA evaluates the information provided to verify the identity of the customer. Currently, many of the verification processes (or parts thereof) are automated. For certificates issued to an individual, the information provided to a CA may include identity documents used to prove that the individual requesting the certificate is, in fact, that individual.

However, the automated processes may be inadequate for some requests and some authentication processes include steps beyond just automated verification. For example, the CA may be unable to verify certain organization information online. Further, the CA may require a notarized letter from the customer that verifies the organization information. As a result, the CA contacts a representative of the customer (e.g., a server administrator, a human resources director, etc.), to complete the authentication process. The time between the CA contacting a representative and the representative providing the required information to the CA varies widely. For instance, the CA might contact an incorrect representative (e.g., the human resources director might be the wrong contact within the organization), or the representative might not follow up with the CA until much later. The bottleneck arising from the verification component creates delay and unpredictability in the time required to deliver delivering the certificate to the customer, which in turn leads to customer dissatisfaction.

SUMMARY

Embodiments presented herein include a method for identifying and authenticating potential customers of digital certificates prior to receiving a request from the potential customers. The method generally includes generating, via a processor, a list of potential customers to target in the issuance of digital certificates. The list includes domain and organization information associated with each potential customer. The method also generally includes verifying, using one or more databases, the domain and organization information for each potential customer. Upon successfully verifying the domain and organization information for one or more of the potential customers, a digital certificate enrollment process is initiated for one or more of the potential customers.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein provide techniques for performing portions of a digital certificate enrollment verification process performed by a certificate authority for certain prospective customers. The techniques disclosed herein allow a certificate authority (CA) to identify and authenticate potential digital certificate customers prior to receiving an enrollment request for a digital certificate from such customers. In one embodiment, the CA generates a list of prospective customers. For example, the CA may obtain information about certificates issued by other CAs that are going to expire within a specified time frame. The CA may also obtain information from web services or "crawlers" that scan networked servers that have certificates installed, and the like. The CA may also collect domain and business entity information from public databases and/or third-party business information sources. Thereafter, the CA determines which prospective customers to target in certificate enrollment campaigns based on the success of the information retrieval. In addition to simply advertising services to likely customers, in one embodiment, the CA initializes an enrollment for each targeted customer prior to receiving a request from the customer.

Doing so allows the CA to complete a portion of the certificate verification process for a prospective customer before the customer requests a certificate from the CA. As a result, any remaining information required by the CA can be obtained shortly after the customer orders a certificate, if any is needed at all. For example, a CA may advise the customer (e.g., via e-mail) to expect a telephone call from the CA requesting the information. Advantageously, this approach makes the certificate enrollment and issuance process more efficient by reducing the time spent in verifying the customer.

Figure 1:
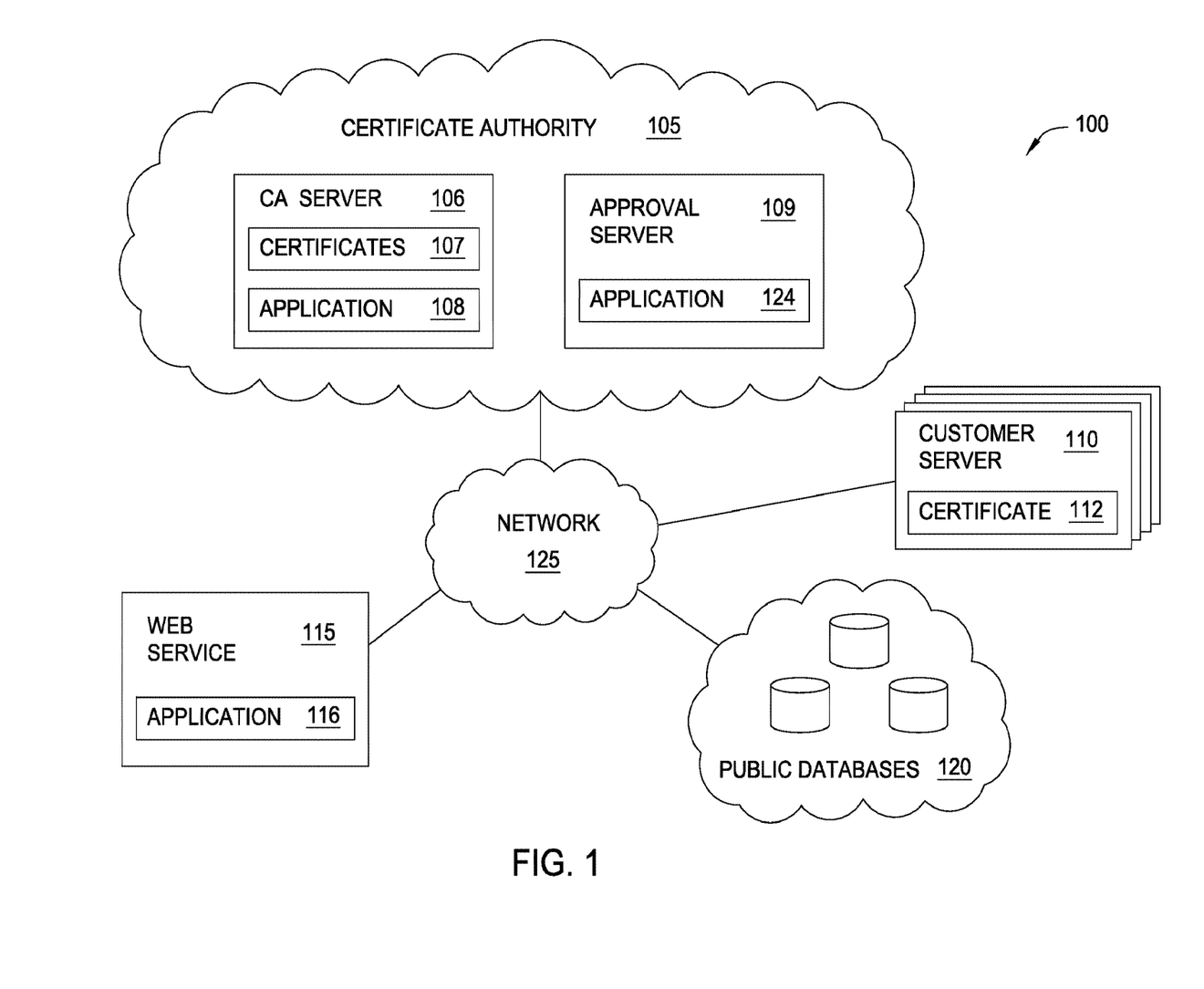
FIG. 1 illustrates an example computing environment, according to one embodiment.

FIG. 1 illustrates an example computing environment 100, according to one embodiment. The computing environment 100 includes a certificate authority (CA) 105. CA 105 may be a network of servers performing different tasks. CA 105 may include a CA server 106 and an approval server 109. CA server 106 generates certificates 107 using an application 108 and verifies the validity of certificates 107 to any relying party. Such certificates 107 may be Secure Sockets Layer (SSL) certificates or Transport Layer Security (TLS) certificates, among other certificate types. Approval server 109 includes an application 124 that identifies prospective customers using collected data from customer servers 110. Additionally, application 124 may approve customers in real-time (i.e., for unsolicited customers that order certificates from CA 105 without having undergone any prior approval process).

CA 105 (e.g., through approval server 109) may communicate with a web service 115 over a network 125 (i.e., the Internet) to retrieve potential customer data. Web service 115 includes an application 116 that may scan networked servers (e.g., customer servers 110) to determine whether the servers have certificates 112 installed on them. To do so, application 116 may scan ports of customer servers 110, and if there is a certificate 112 installed, web service 115 retrieves the certificates and extracts information from the certificates pertinent to certificate verification processes. Or alternatively, web service 115 may also identify potential customers even if customer server 110 does not have any certificates installed, for example, if the web service 115 detects that customer server 110 provides website forms that request sensitive data, such as usernames and passwords. Or more simply, that a web server is responding to requests for a default index at a given domain. Approval server 109 may request web service 115 to generate a list that identifies prospective customers to target in certificate enrollment campaigns.

Once CA 105 has a list of prospective customers (e.g., generated through one of its own servers, obtained from web service 115, etc.), CA 105 retrieves customer information in the list through public databases 120 accessible over network 125. For example, the application server 109 may query public databases 120, such as the WHOIS databases, Secretary of State websites, third-party business information services, and the like.

After collecting customer data, approval server 109 determines whether a customer server 110 satisfies approval criteria. The approval criteria may be based on several factors, such as amount of pertinent data retrieved, whether the customer is in good standing, the validity period of a current certificate 112 installed on a customer server 110, the price of the current certificate 112 that a customer may be paying, among others. In each case, CA 105 sets the approval criteria to evaluate.

After approval server 109 evaluates each prospective customer, CA 105 (e.g., through an enrollment server) initiates an enrollment process for each customer that satisfies at least some of the approval criteria. That is, CA 105 authenticates the customers for a digital certificate before the customer orders a certificate through CA 105. CA 105 may later target advertising campaigns toward the approved customers, and the approved customers may choose to place an order for certificates. At that point, CA 105 has already performed a significant portion of the certificate verification processes. As a result, CA 105 may deliver a certificate to an approved customer more quickly than if the CA 105 had initiated the entire process only after receiving an order.

Figure 2:
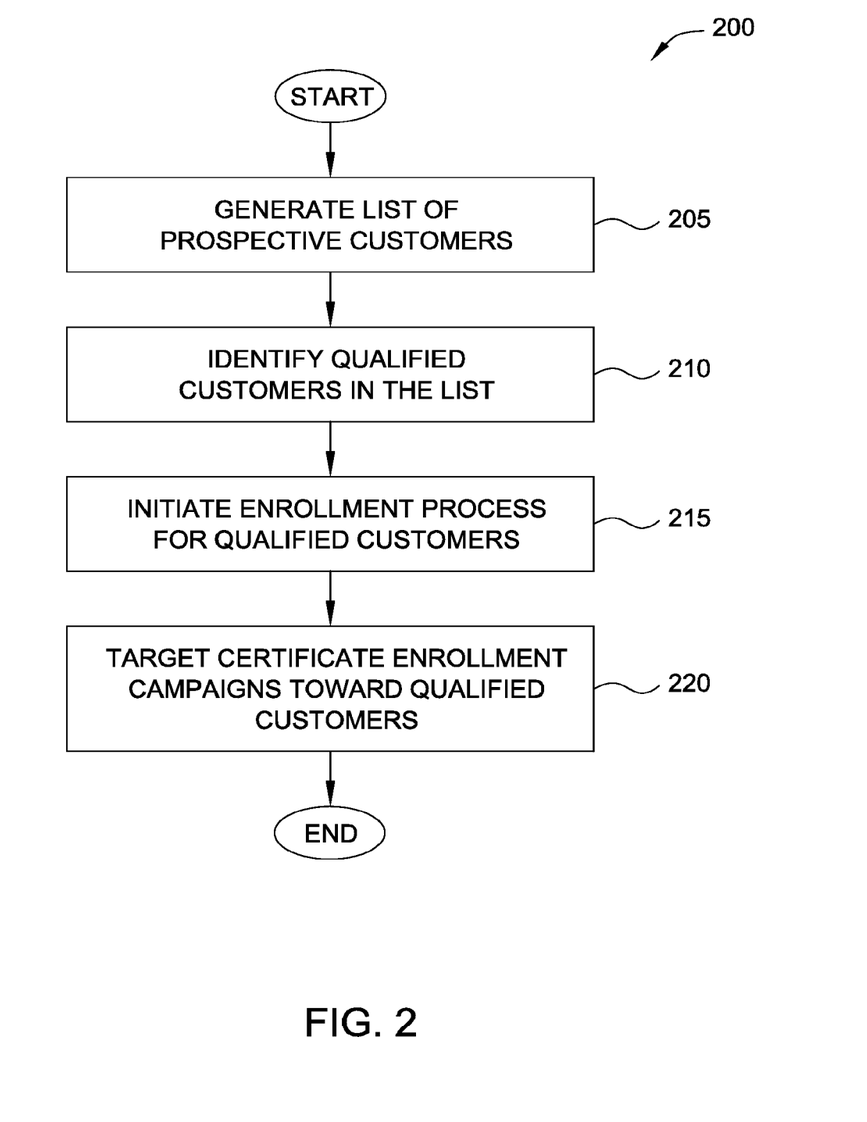
FIG. 2 illustrates a method for identifying customers to target in certificate enrollment campaigns, according to one embodiment.

FIG. 2 illustrates a method 200 for identifying customers to target in certificate enrollment campaigns, according to one embodiment. Note, method 200 provides a broad overview of the steps for identifying the customers. Details of the broader process are further described in FIG. 3 and FIG. 4. Method 200 begins at step 205, where the CA generates a list of potential customers. As described in greater detail in FIG. 3 below, the CA may use a web service that scans networked servers for the presence of installed certificates. If the web service detects such a server, the web service parses certificate data and inputs the data into the list. After a list has been generated, the CA may retrieve further information from public databases using the certificate data. Alternatively, the CA may scan websites for other information other than certificates. For example, the CA may scan a WHOIS server using the domain information for the website to extract company information used in enrolling for a certificate. Similarly, the CA may scan a web site for company name information (e.g., in the footers, in the "About Us" section, etc.). At step 210, once the list is generated, an approval server of the CA identifies customers in the list to target certificate enrollment campaigns. As further described in FIG. 4, the approval server may base approval decisions on a set of criteria.

At step 215, after the approval server identifies customers that satisfy the approval criteria, the CA (through another server) initiates an enrollment process for each targeted customer. For example, the CA performs domain and organization validation processes to the extent allowable by the data collected for each approved customer. That is, the CA performs these authentications before any of the identified approved customers decides to order a certificate from the CA. Doing so reduces the amount of information needed to be obtained before the customer orders a certificate.

At step 220, the CA targets campaigns towards the approved customers. For example, the CA server may send an e-mail message to the address obtained in a WHOIS lookup of the domain of a particular customer and advertise the CA's services to the customer. The e-mail message may contain a link to a website that provides a form for the customer to enter certain information. Continuing the example, once the customer enters the information to the website form, the website may provide a number for the customer to call to complete the registration. Because a substantial portion of the enrollment process has already been completed by the time the customer receives the e-mail, the CA is able to obtain the rest of the information needed via human interaction (if at all) shortly after the customer orders a certificate. Additionally, the enrollment process may be further customized to facilitate collecting any remaining customer information during the enrollment itself. Doing so eliminates the need to collect the remaining information after the enrollment.

Figure 3:
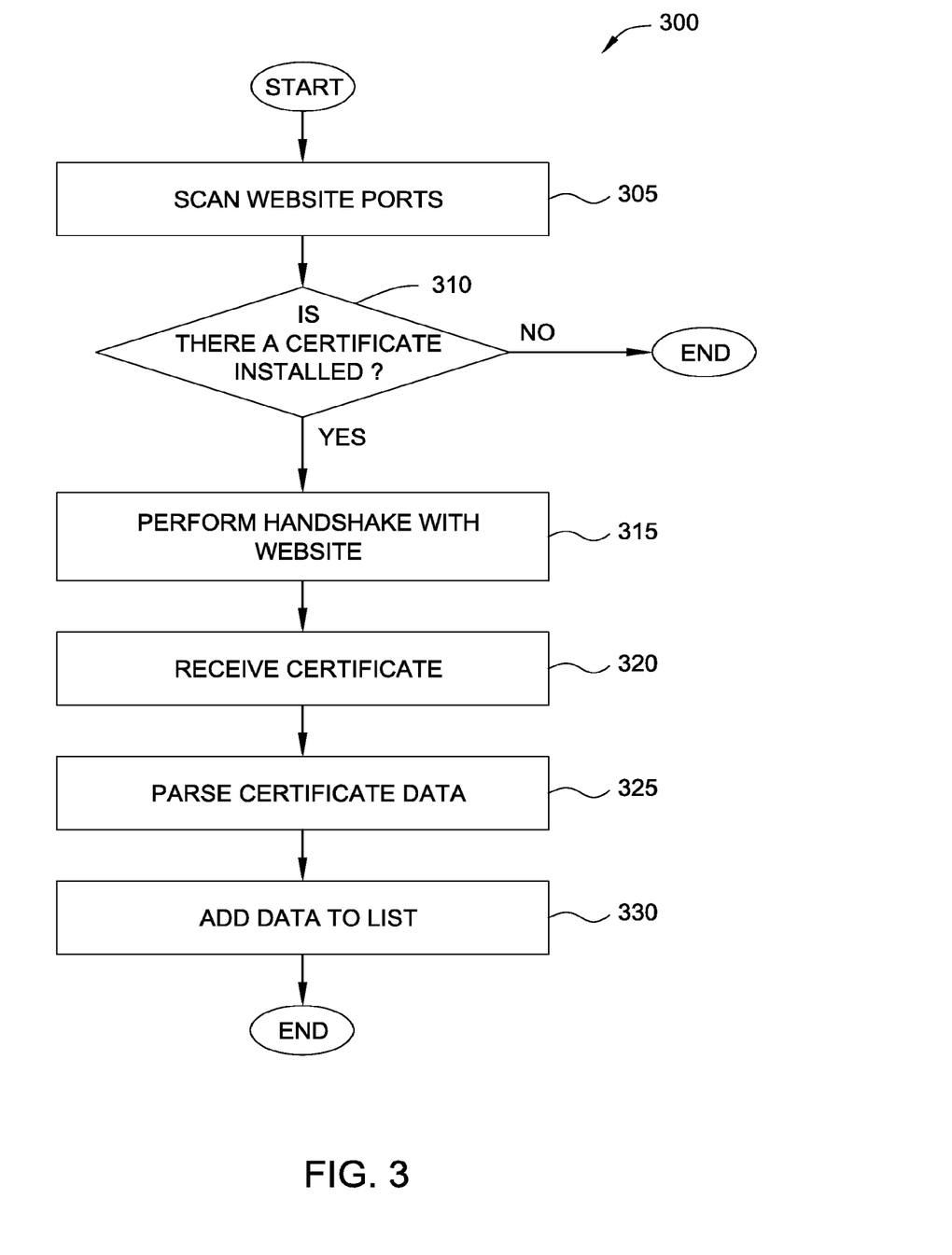
FIG. 3 illustrates a method for generating a list of potential customers, according to one embodiment.

FIG. 3 illustrates an example method 300 for generating the list of potential customers, according to one embodiment. Note that although the CA may generate the list through one of its own servers, the CA may also employ a web service that can scan networked servers to generate the list. At step 305, the web service (or a server of the CA) scans network addresses or domains at ports where certificates are typically installed, e.g., port 443 for HTTPS sessions. The web service scans the ports to determine whether a certificate is installed on the server (step 310).

At step 315, if the web service detects a certificate on the website, then the website initiates a connection with the website and performs a handshake. Doing so results in the website sending the certificate to the web service. At step 320, the website receives the certificate. At step 325, the web service parses certificate data and retrieves information pertinent to the certificate enrollment process. Examples of pertinent information may include domain names, organization name, contact information, etc. At step 330, the web service adds the collected information to a list and scans the next server.

Alternatively, if the website does not have a certificate installed, the web service may also scan the website for online forms that request secure data, such as usernames and passwords. The CA may want to target such websites in certificate campaigns. Thus, if the web service detects such forms on the website, the web service may collect the website information for speculative enrollment.

Figure 4:
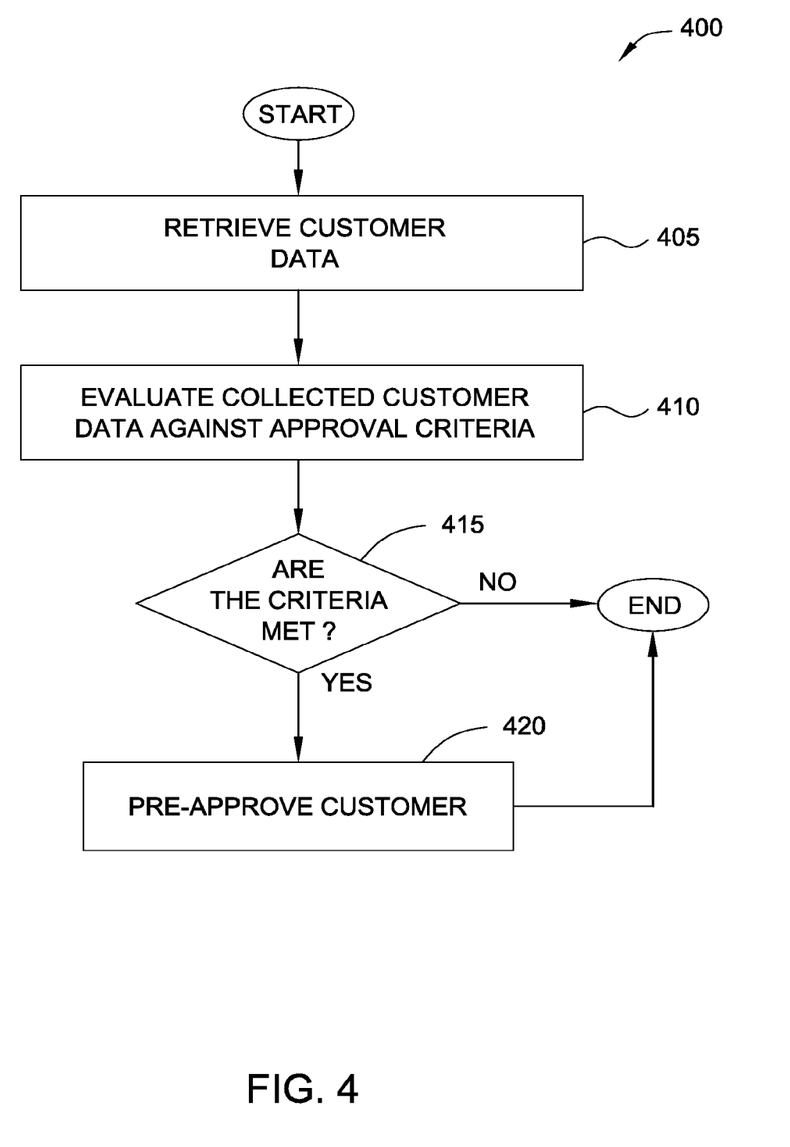
FIG. 4 illustrates a method for identifying approved customers in a list of potential customers, according to one embodiment.

FIG. 4 illustrates a method 400 for identifying approved customers in the list of potential customers, according to one embodiment. In this case, assume a third-party web service has generated a list of potential customers on behalf of the CA. As stated, the list may contain, for each customer's server, pertinent information for enrolling a customer in a certificate program.

At step 405, the approval server retrieves data for certificate information of each customer on the list through public databases to the extent allowable. For example, the approval server may automate lookup of WHOIS databases for domain registration as well as scour business database sites for business entity collection. However, the approval server may be unable to retrieve some data. In such a case, the CA may collect missing information for an approved customer after the customer requests a certificate.

At step 410, the approval server evaluates the collected customer data against a set of approval criteria. The approval criteria may be based on several factors. For instance, the approval server may evaluate the amount of information collected for a particular server and make an approval decision based on the amount of information collected for that server (e.g., by establishing a threshold for collected information). In addition, the approval server may establish criteria based on the date of expiration of the current certificate. For example, the CA may want to target campaigns towards customers whose certificates are set to expire within the next three months. Another factor includes a presumed price a customer has paid for the certificate retrieved during the crawling process. That is, the CA may want to offer similar certificates to a customer at a lower rate than the customer presumably paid for a current certificate. At any rate, the approval criteria may be set based on the needs of the CA.

At step 415, the approval server determines whether the criteria are met. If so, the approval server designates the customer as approved (e.g., by adding the customer data to a list of approved customers). The approval server continues to iterate through the list until all of the customers that satisfy the approval criteria are identified.

Figure 5:
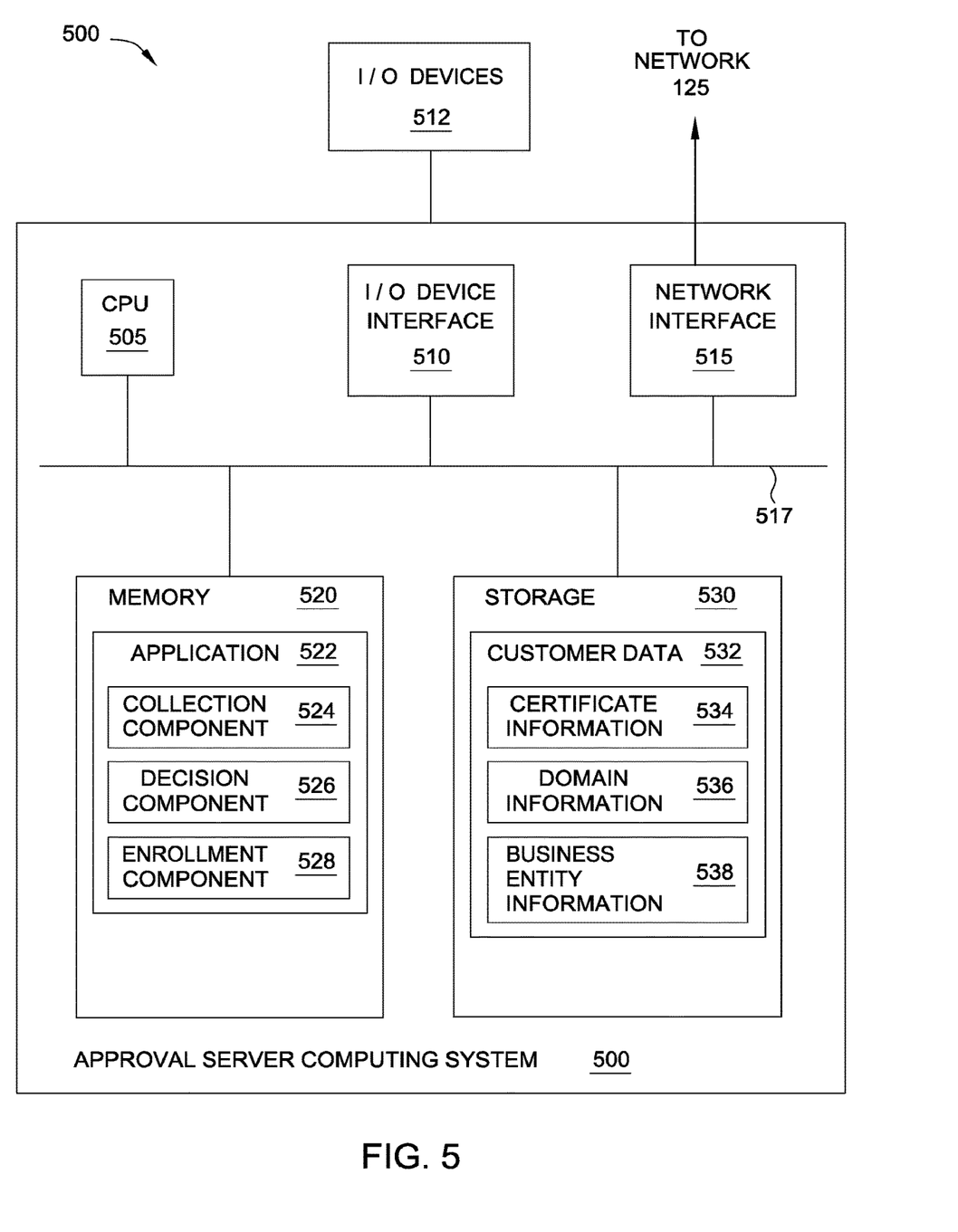
FIG. 5 illustrates an example approval server configured with an application configured to collect targeted customer data and identify qualified customers, according to one embodiment.

FIG. 5 illustrates an example approval server computing system 500 configured with an application configured to collect customer data and identify qualified customers from the data, according to one embodiment. As shown, the computing system 500 includes, without limitation, a central processing unit (CPU) 505, a network interface 515, a network interface 515, a memory 520, and storage 530, each connected to a bus 517. Computing system 500 may also include an I/O device interface 510 connecting I/O devices 512 (e.g., keyboard, display and mouse devices) to computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in memory 520 as well as stores and retrieves application data residing in the memory 520. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Illustratively, the memory 520 includes an application 522. Application 522 itself includes a collection component 524, a decision component 526, and an enrollment component 528. Collection component 524 retrieves prospective customer data 532 from networked servers that have digital certificates installed. Further, collection component 524 parses customer data 532 to obtain certificate information 534. Collection component 524 may then retrieve domain information 536 and business entity information 538 of each scanned server by searching through public databases with certificate information 534. Thereafter, collection component 524 stores customer data 532 in storage 530. Decision component 526 identifies approved customers based on the collected customer data 532 and on approval criteria (e.g., the amount of pertinent customer data 532 collected for a given prospective customer, the type of certificate that the prospective customer currently has installed, the expiration date of the certificate currently installed on the prospective customer's server, etc.).

After decision component 526 identifies the approved customers, enrollment component 528 initiates certificate verification processes using the collected customer data 532 corresponding to each approved customer. For example, enrollment component 528 may process domain information 536 through WHOIS servers to perform domain validation. Further, enrollment component 528 may process business entity information 538 through public databases to perform organization validation.

Note that collection component 524, decision component 526, and enrollment component 528 are not required to be part of one application 522. For example, each component may be separate applications on different server computing systems. Further, collection component 524 may also be a part of a third-party web service that performs the same customer information collection functions described above.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, servers of the CA (e.g., the approval server, the CA server, web services, portal interface servers accessible by customer servers, etc.) may be hosted on a cloud network provided by the CA.

As described, embodiments presented herein provide techniques for authenticating a user requesting access to a cloud based or hosted application. As part of the authentication process, a relying application presents a challenge by encoding a nonce in a QR code that can be scanned by a mobile device. Advantageously, this approach does not require a computing device to have a correct set of device drivers for a hardware token or installing a copy of a private key on each device used to access the hosted application. Accordingly, embodiments provide an authentication process that allows users to access hosted applications in cases where it is unknown where the users will be accessing the hosted application from or what systems they will be using to access the hosted application.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing a partial authentication of organization information prior to receiving a request for a digital certificate, the method comprising:
    identifying, by a processor associated with a certificate authority, a computer server, the computer server hosting a website;
    performing, by the processor, with the computer server, a security handshake;
    scanning the website for online forms provided by the website to a user that request secure data provided by the user to the online forms;
    responsive to detecting online forms that request secure data, receiving, by the processor, information associated with the website hosted by the computer server based at least in part on performing the security handshake;
    identifying, by the processor, organization information of an organization associated with the website hosted by the computer server based on the information associated with the website hosted by the computer server;

prior to receiving a request for a digital certificate, performing a first partial authentication, by the processor, of the organization for the digital certificate by verifying the organization information, wherein authentication of the organization is based on the first partial authentication and a second partial authentication, wherein the first partial authentication comprises performing one or more initial steps of the authentication of the organization:

receiving, by the processor, the request for the digital certificate from the organization;

based on receiving the request for the digital certificate and performing the first partial authentication, performing, by the processor, the second partial authentication of the organization for the digital certificate, wherein the second partial authentication comprises performing one or more targeted campaigns towards the approved user; and generating, by the processor, the digital certificate based on the first partial authentication and the second partial authentication.

2. The method of claim 1, further comprising, prior to receiving the request for the digital certificate from the organization, sending a message to the organization, wherein the message indicates an availability of a partially approved digital certificate.

3. The method of claim 1, wherein after to the organization receives a request from the customer, the second partial authentication is based on information obtained from the organization after receiving the request for the digital certificate from the organization.

4. The method of claim 1, further comprising:
receiving, by the processor, the request for the digital certificate from the organization.

5. The method of claim 1, wherein the digital certificate is a first digital certificate, wherein the information associated with the website hosted by the computer server comprises a second digital certificate.

6. The method of claim 1, further comprising:
verifying, by the processor, the organization information of one or more potential customers of the organization.

7. The method of claim 1, wherein identifying the organization information of the organization is based on querying one or more of a WHOIS database and a third party business information service, and a governmental website.

8. A system, comprising:
a processor associated with a certificate authority; and
non-transitory, computer readable media storing computer-executable instructions for performing a partial authentication of organization information prior to receiving a request for a digital certificate, wherein the computer-executable instructions when executed by the processor, cause the processor to:
identify a computer server, the computer server hosting a website;
perform, with the computer server, a security handshake;
scan the website for online forms provided by the website to a user that request secure data provided by the user to the online forms;
responsive to detecting online forms that request secure data, receive information associated with the website hosted by the computer server based at least in part on performing the security handshake;
identify organization information of an organization associated with the website hosted by the computer server based on the information associated with the website hosted by the computer server;
prior to receiving a request for a digital certificate, perform a first partial authentication of the organization for the digital certificate by verifying the organization information, wherein authentication of the organization is based on the first partial authentication and a second partial authentication, wherein the first partial authentication comprises performing one or more initial steps of the authentication of the organization;
receiving, by the processor, the request for the digital certificate from the organization;
based on receiving the request for the digital certificate and performing the first partial authentication, performing, by the processor, the second partial authentication of the organization for the digital certificate, wherein the second partial authentication comprises performing one or more targeted campaigns towards the approved user; and
generating, by the processor, the digital certificate based on the first partial authentication and the second partial authentication.

9. The system of claim 8, wherein the computer-executable instructions, when executed by the processor, further cause the processor to:
receive the request for the digital certificate from the organization;
based on receiving the request for the digital certificate and performing the first partial authentication, perform the second partial authentication of the organization for the digital certificate, wherein the second partial authentication comprises performing one or more subsequent steps of the authentication of the organization; and
generate the digital certificate based on the first partial authentication and the second partial authentication.

10. The system of claim 8, wherein the computer-executable instructions, when executed by the processor, further cause the processor to, prior to receiving the request for the digital certificate from the organization, send a message to the organization, wherein the message indicates an availability of a partially approved digital certificate.

11. The system of claim 8, wherein the second partial authentication is based on information obtained from the organization after receiving the request for the digital certificate from the organization.

12. The system of claim 8, wherein the computer-executable instructions, when executed by the processor, further cause the processor to receive the request for the digital certificate from the organization.

13. The system of claim 8, wherein the digital certificate is a first digital certificate, wherein the information associated with the website hosted by the computer server comprises a second digital certificate.

14. The system of claim 8, wherein the computer-executable instructions, when executed by the processor, further cause the processor to verify the organization information of the organization.

15. The system of claim 8, wherein to identify the organization information of the organization, the computer-executable instructions, when executed by the processor, further cause the processor to identify the organization information based on querying a WHOIS database.

16. A non-transitory computer-readable storage medium storing computer-executable instructions for performing a partial authentication of organization information prior to receiving a request for a digital certificate that, when executed by a processor, cause the processor to:

identify a computer server, the computer server hosting a website;

perform, with the computer server, a security handshake;

scan the website for online forms provided by the website to a user that request secure data provided by the user to the online forms;

responsive to detecting online forms that request secure data, receive information associated with the website hosted by the computer server based at least in part on performing the security handshake;

identify organization information of an organization associated with the website hosted by the computer server based on the information associated with the website hosted by the computer server;

prior to receiving a request for a digital certificate, perform a first partial authentication of the organization for the digital certificate by verifying the organization information, wherein authentication of the organization is based on the first partial authentication and a second partial authentication, wherein the first partial authentication comprises performing one or more initial steps of the authentication of the organization; and receiving, by the processor, the request for the digital certificate from the organization;

based on receiving the request for the digital certificate and performing the first partial authentication, performing, by the processor, the second partial authentication of the organization for the digital certificate, wherein the second partial authentication comprises performing one or more targeted campaigns towards the approved user; and generating, by the processor, the digital certificate based on the first partial authentication and the second partial authentication.

17. The non-transitory computer-readable storage medium of claim 16, wherein the computer-executable instructions, when executed by the processor, further cause the processor to:

receive the request for the digital certificate from the organization;

based on receiving the request for the digital certificate and performing the first partial authentication, perform the second partial authentication of the organization for the digital certificate, wherein the second partial authentication comprises performing one or more subsequent steps of the authentication of the organization; and generate the digital certificate based on the first partial authentication and the second partial authentication.

18. The non-transitory computer-readable storage medium of claim 16, wherein the computer-executable instructions, when executed by the processor, further cause the processor to, prior to receiving the request for the digital certificate from the organization, send a message to the organization, wherein the message indicates an availability of a partially approved digital certificate.

19. The non-transitory computer-readable storage medium of claim 16, wherein the digital certificate is a first digital certificate, wherein the information associated with the website hosted by the computer server comprises a second digital certificate.

* * * * *